(12) United States Patent
Miyahara et al.

(10) Patent No.: US 12,530,654 B2
(45) Date of Patent: Jan. 20, 2026

(54) DELIVERY SYSTEM AND ITS DELIVERY METHOD

(71) Applicant: TOYOTA JIDOSHA KABUSHIKI KAISHA, Aichi-ken (JP)

(72) Inventors: Kenta Miyahara, Tokyo-to (JP); Junya Ota, Tokyo-to (JP); Hirotaka Komura, Tokyo-to (JP); Kenta Muramoto, Narashino (JP); Shunta Shimizu, Tokyo-to (JP); Kazuto Konishi, Tokyo-to (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/665,574

(22) Filed: May 16, 2024

(65) Prior Publication Data

US 2024/0394651 A1 Nov. 28, 2024

(30) Foreign Application Priority Data

May 22, 2023 (JP) ................. 2023-083997

(51) Int. Cl.
*G06Q 10/0836* (2023.01)
*G07C 9/00* (2020.01)
*A47G 29/12* (2006.01)

(52) U.S. Cl.
CPC ..... *G06Q 10/0836* (2013.01); *G07C 9/00857* (2013.01); *A47G 29/1218* (2013.01); *G07C 9/00571* (2013.01); *G07C 9/00896* (2013.01)

(58) Field of Classification Search
CPC ......... G06Q 10/02; G06Q 10/08–0838; G07C 9/00857; G07C 9/00571; G07C 9/00896; A47G 29/1218

(Continued)

(56) References Cited

U.S. PATENT DOCUMENTS

| 2007/0005452 A1* | 1/2007 | Klingenberg | ........ G06Q 20/203 705/334 |
| 2007/0016643 A1* | 1/2007 | Boss | ...................... H04L 51/04 709/206 |

(Continued)

FOREIGN PATENT DOCUMENTS

| JP | 2018-113037 A | 7/2018 |
| JP | 2019-000291 A | 1/2019 |
| JP | 2022-042822 A | 3/2022 |

OTHER PUBLICATIONS

Amazon "Collect a Package at an Amazon Hub Locker" <https://www.amazon.com/gp/help/customer/display.html?nodeId=GRQMENKQV9RQ6BWF> (<https://web.archive.org/web/20230202045758/https://www.amazon.com/gp/help/customer/display.html?nodeId=GRQMENKQV9RQ6BWF> captured on Feb. 2, 2023 using Wayback Machine). (Year: 2023).*

*Primary Examiner* — Michael P Harrington
*Assistant Examiner* — Brian A Tallman
(74) *Attorney, Agent, or Firm* — HAUPTMAN HAM, LLP

(57) ABSTRACT

A delivery system includes a storage box, receiver terminals, a deliverer terminal, and a server. The deliverer terminal transmits, to the server, identification information of the storage box storing a delivery item and identification information of a destination receiver of the delivery item. The server transmits delivery information to the receiver terminal of the destination receiver based on the identification information of the destination receiver of the delivery item. The receiver terminal of the destination receiver transmits, to the server, information of an alternate receiver set based on relevant information about a person in the same building as the destination receiver. The server transmits, to the receiver terminal of the alternate receiver, the identification information of the storage box and unlocking key informa- (Continued)

tion for unlocking the storage box, based on the information of the alternate receiver transmitted from the receiver terminal of the destination receiver.

11 Claims, 3 Drawing Sheets

(58) Field of Classification Search
USPC .......................................................... 705/339
See application file for complete search history.

(56) References Cited

U.S. PATENT DOCUMENTS

| | | | | |
|---|---|---|---|---|
| 2013/0325893 | A1* | 12/2013 | Asay | G06Q 10/083 |
| | | | | 707/769 |
| 2015/0106296 | A1* | 4/2015 | Robinson | G06Q 10/0838 |
| | | | | 705/339 |
| 2017/0249581 | A1* | 8/2017 | Hens | G06N 5/02 |
| 2018/0060812 | A1* | 3/2018 | Robinson | G06Q 10/1093 |
| 2018/0336612 | A1* | 11/2018 | Bullard, III | H04L 9/3234 |
| 2020/0374383 | A1* | 11/2020 | McGarvey | H04W 4/14 |
| 2021/0165872 | A1* | 6/2021 | Kato | G06Q 10/083 |
| 2023/0232322 | A1* | 7/2023 | Singh | H04W 60/00 |
| | | | | 370/329 |

* cited by examiner

DELIVERY SYSTEM AND ITS DELIVERY METHOD

CROSS REFERENCE TO RELATED APPLICATIONS

This application is based upon and claims the benefit of priority from Japanese patent application No. 2023-083997, filed on May 22, 2023, the disclosure of which is incorporated herein in its entirety by reference.

BACKGROUND

The present disclosure relates to a delivery system for delivering delivery items and its delivery method.

A delivery system using a delivery box apparatus equipped with a server storing a storage box number and an unlocking number in association with each other and transmitting a box number of a delivery item and the unlocking number to a receiver terminal is known (for example, see Japanese Unexamined Patent Application Publication No. 2018-113037).

SUMMARY

There is a desire to enable designated individuals within a specific range, such as a person in the same department as a receiver or a family member to receive a delivery item in a delivery box, while also assuring the privacy of the receiver of the delivery item is respected.

The present disclosure has been made to solve such a problem, and the main object of the present disclosure is to provide a delivery system and its delivery method that can set a receiver within a certain range while also assuring the privacy of the receiver is respected.

An aspect of the present disclosure to achieve the above object is a delivery system including:
  at least one storage box capable of storing a delivery item;
  a plurality of receiver terminals used by receivers of the delivery item;
  a deliverer terminal used by a deliverer of the delivery item; and
  a server capable of communicating with each of the receiver terminals and the deliverer terminal, wherein
  the deliverer terminal transmits, to the server, identification information of the storage box storing the delivery item and identification information of a destination receiver of the delivery item,
  the server transmits, based on the identification information of the destination receiver of the delivery item transmitted from the deliverer terminal, delivery information notifying the receiver terminal of the destination receiver that the delivery item has been or will be delivered in the storage box,
  the receiver terminal of the destination receiver transmits, to the server, information of an alternate receiver set based on relevant information about a person who is in the same building as the destination receiver and is related to the receiver, and
  the server transmits, to the receiver terminal of the alternate receiver, the identification information of the storage box and unlocking key information for unlocking the storage box, based on the information of the alternate receiver transmitted from the receiver terminal of the destination receiver.

In this aspect, the receiver terminal of the destination receiver may display predetermined specific information or group information on a screen in a selectable manner based on the relevant information, and the receiver terminal of the destination receiver may set the alternate receiver based on the selection made by the destination receiver, and may transmit information of the set alternate receiver to the server.

In this aspect, the server may set information of at least one alternate receiver based on the relevant information and transmits the set information of the alternate receiver together with the delivery information to the receiver terminal of the destination receiver, the receiver terminal of the destination receiver may transmit, to the server, the information of the at least one alternate receiver selected based on the information of the alternate receiver transmitted from the server, and the server may transmit the identification information of the storage box and the unlocking key information for unlocking the storage box to the receiver terminal of the alternate receiver based on the information of the alternate receiver transmitted from the receiver terminal of the destination receiver.

In this aspect, the server may set the at least one alternate receiver based on the relevant information and a content of the delivery item.

In this aspect, the receiver terminal of the destination receiver may transmit, to the server, the information of a plurality of alternate receivers selected based on the information of the alternate receivers transmitted from the server, in accordance with the priority, the server may transmit the information inquiring whether it is possible to receive the delivery item in the storage box to the receiver terminals of the alternate receivers based on the information of the plurality of alternate receivers transmitted from the receiver terminal of the destination receiver, and when the server receives information of an answer that the delivery item in the storage box can be received from the receiver terminal of the alternate receiver, the server may transmit the identification information of the storage box and the unlocking key information for unlocking the storage box to the receiver terminal of the alternate receiver.

In this aspect, the server may have a priority set for transmitting the query information to the alternate receivers. In accordance with the priority, the server may transmit the information inquiring whether it is possible to receive the delivery item in the storage box to the receiver terminals of the alternate receivers.

In this aspect, the priority may be set based on, for example, the distance from the storage box 2 to the receiver terminal. The priority may also be set based on past receipt history information.

Another aspect of the present disclosure to achieve the above object is a delivery method performed by a delivery system including:
  at least one storage box capable of storing a delivery item;
  a plurality of receiver terminals used by receivers of the delivery item;
  a deliverer terminal used by a deliverer of the delivery item; and
  a server capable of communicating with each of the receiver terminals and the deliverer terminal, the delivery method may be including:
    transmitting, by the deliverer terminal to the server, identification information of the storage box storing the delivery item and identification information of a destination receiver of the delivery item,
    transmitting by the server, based on the identification information of the destination receiver of the delivery item transmitted from the deliverer terminal, delivery information notifying the receiver terminal of the destination receiver that the delivery item has been or will be delivered in the storage box;

transmitting, by the receiver terminal of the destination receiver to the server, information of an alternate receiver set based on relevant information about a person who is in the same building as the destination receiver and is related to the receiver; and transmitting, by the server to the receiver terminal of the alternate receiver, the identification information of the storage box and unlocking key information for unlocking the storage box, based on the information of the alternate receiver transmitted from the receiver terminal of the destination receiver.

According to the present disclosure, it is possible to provide a delivery system and its delivery method that can set a receiver within a certain range while also assuring the privacy of the receiver is respected.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
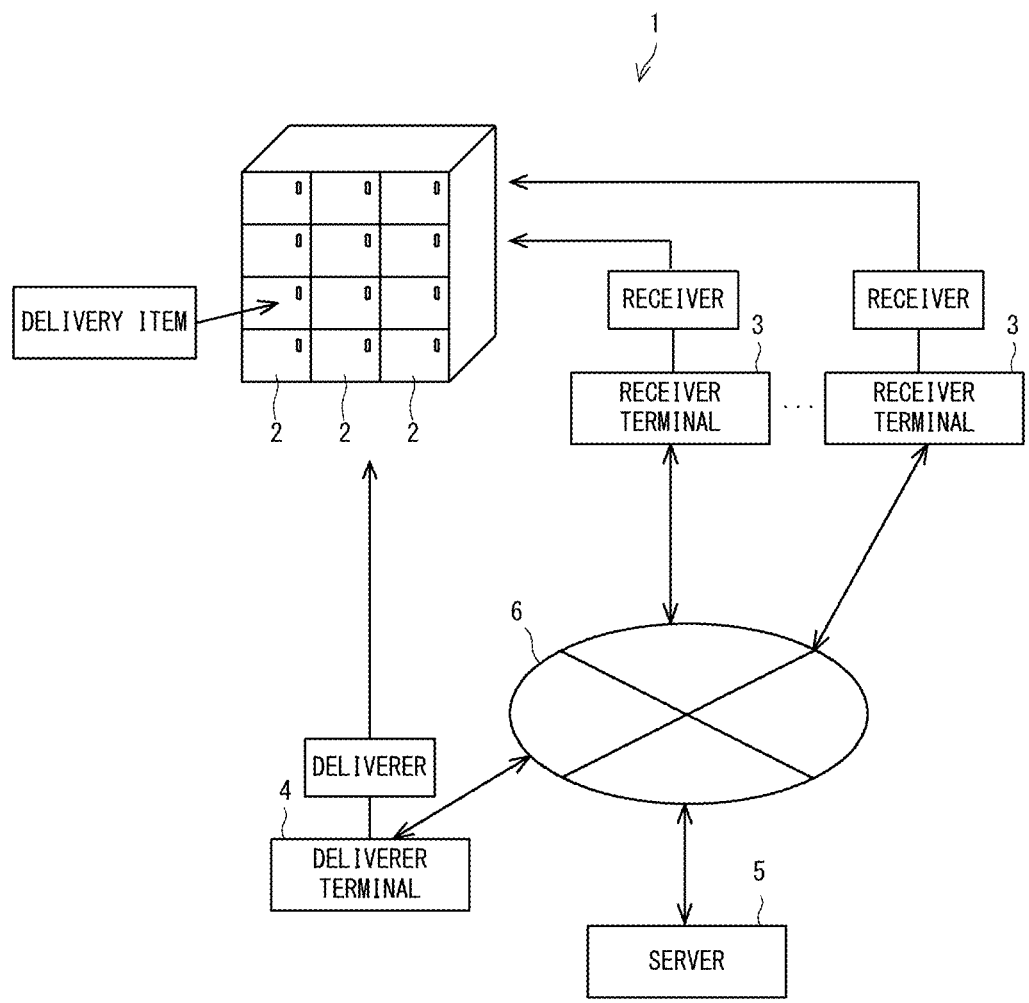
FIG. 1 is an overview diagram showing a schematic system configuration of a delivery system according to this embodiment.

Hereinafter, the present disclosure will be described through the embodiments, but the claimed invention is not limited to the following embodiments. Also, not all of the configurations described in the embodiments are essential as means for solving the problem. For clarity, the following descriptions and drawings have been omitted and simplified as appropriate. In each drawing, the same elements have the same reference numerals, and repeated descriptions have been omitted as necessary.

First Embodiment

Hereinafter, this embodiment will be described with reference to the drawings. A delivery system according to this embodiment allows a certain range of individuals, such as company department members or family members, to receive delivery items, such as those delivered in a delivery box by, for example, a transportation carrier or those delivered within a facility, while also assuring the privacy of the receiver is respected.

FIG. 1 is an overview diagram showing a schematic system configuration of a delivery system according to this embodiment. A delivery system 1 according to this embodiment includes at least one storage box 2 capable of storing a delivery item, a plurality of receiver terminals 3 used by receivers of delivery items, a deliverer terminal 4 used by a carrier of the delivery items, and a server 5 capable of communicating with each of the receiver terminals 3 and the deliverer terminal 4.

The receiver terminals 3 and deliverer terminal 4 are communicatively connected to the server 5 via a communication network 6 such as the Internet and a wireless LAN.

Each of the receiver terminals 3, the deliverer terminal 4, and the server 5 has a normal computer hardware configuration including, for example, a processor such as a CPU (Central Processing Unit) or a GPU (Graphics Processing Unit), an internal memory such as a RAM (Random Access Memory) or a ROM (Read Only Memory), a storage device such as an HDD (Hard Disk Drive) or an SSD (Solid State Drive), an input/output I/F for connecting a peripheral device such as a display, and a communication I/F for communicating with a device external to the apparatus.

The storage box 2 is, for example, a delivery box capable of storing a delivery item such as a delivery package. Although a plurality of the storage boxes 2 are provided in this example, a single storage box 2 may be provided.

The storage box 2 is provided with a sensor capable of reading code information such as, for example, a QR code (registered trademark) and a bar code. The receiver can, for example, display the code information on a screen of a mobile terminal such as a smartphone and unlock the storage box 2 by holding it over the sensor. The receiver terminals 3 and deliverer terminal 4 are, for example, mobile terminals such as smartphones and tablets.

Figure 2:
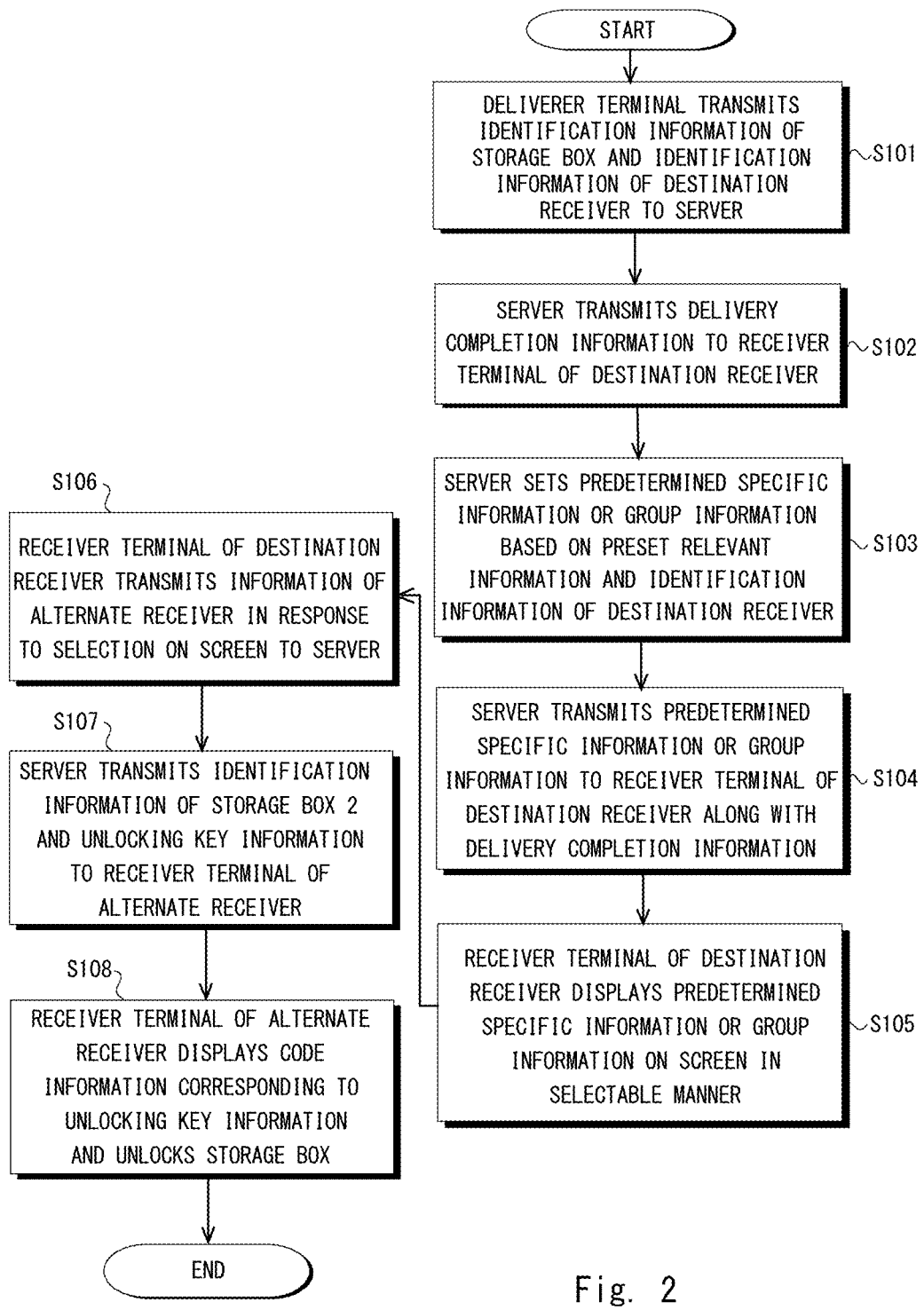
FIG. 2 is a flowchart showing an example of a flow of a delivery method according to this embodiment.

FIG. 2 is a flowchart showing an example of a flow of a delivery method according to this embodiment. For example, when a deliverer stores a delivery item in the storage box 2, the deliverer inputs on the deliverer terminal 4 identification information of the storage box 2 storing the delivery item and the identification information of the receiver (hereinafter referred to as ad destination receiver) that is the destination of the delivery item.

The identification information of the storage box 2 is information for specifying the storage box 2, for example, a box number. The identification information of the receiver is information for identifying the receiver, for example, an email address, a telephone number, and an ID of SNS. The deliverer terminal 4 transmits the input identification information of the storage box 2 and the identification information of the destination receiver to the server 5 (step S101).

Based on the identification information of the destination receiver from the deliverer terminal 4, the server 5 transmits the delivery information notifying the receiver terminal 3 of the destination receiver that the delivery item has been delivered in the storage box 2 (step S102). The server 5 may transmit the delivery information notifying the receiver terminal 3 of the destination receiver that the delivery item is scheduled to be delivered in the storage box 2 based on the identification information of the destination receiver from the deliverer terminal 4.

The server 5 sets predetermined specific information or group information based on preset relevant information and the identification information of the destination receiver (step S103). The relevant information is information about a person who is in the same building as the destination receiver and is related to the destination receiver.

The relevant information is, for example, organizational data of a person who belongs to a company, school, union, organization, room, etc. in the same building. The predetermined specific information can identify the receiver, such as a room number near the room of the destination receiver. The group information is information that can identify the receiver to a certain extent, for example, a department name to which the destination receiver belongs. This relevant information can be used to set a certain range of individuals to receive the package delivered in the storage box 2, as described later.

The server 5, along with the delivery information, transmits the set predetermined specific information or group information to the receiver terminal 3 of the destination receiver (step S104). The receiver terminal 3 of the destination receiver displays the predetermined specific information or group information transmitted from the server 5 on the screen in a selectable manner (step S105).

The receiver terminal 3 of the destination receiver displays as the predetermined specific information, for example, a room number (room number on the same floor, next room number, etc.) in the vicinity of the destination receiver on the screen in a selectable manner. The receiver terminal 3 of the destination receiver displays as the group information, for example, a department name identical to or close to that of the destination receiver on the screen in a selectable manner. In this way, when the destination receiver selects an alternate receiver on the selection screen, information related to privacy such as the alternate receiver's name is not displayed, allowing consideration for the privacy of that receiver.

The receiver terminal 3 of the destination receiver sets the information of the alternate receiver such as the room number and the department name in response to the selection on the selection screen by the destination receiver, and transmits the set information of the alternate receiver to the server 5 (step S106). In this way, it is possible to set the delivery item delivered in the storage box 2 or the like so that it can be received by a certain range of individuals while also assuring the privacy of the receiver of the delivery item is respected.

The server 5 may set the information of at least one alternate receiver (such as a room number in the same building) based on the relevant information, and transmit the set information of the alternate receiver together with the delivery information to the receiver terminal 3 of the destination receiver. Here, the alternate receiver is a person who receives the delivery item on behalf of the destination receiver. The receiver terminal 3 of the destination receiver may transmit, to the server 5, the information of the at least one alternate receiver selected based on the information of the alternate receiver transmitted from the server 5. Thus, the server 5 proposes an alternate receiver, and the destination receiver can easily set the alternate receiver in accordance with the proposal.

The server 5 may set at least one alternate receiver based on the relevant information and the content of the delivery item. By doing so, in consideration of the content of the delivery item, another more optimal receiver can be set. For example, the server 5 may set a person close to the destination receiver as the alternate receiver when the delivery item is a predetermined item.

More specifically, the server 5 may set a neighbor of the destination receiver as the alternate receiver when the delivery item is food or the like. Further, if the delivery item is expensive or fragile, the server 5 may set a family member of the destination receiver as the alternate receiver. The relationship between the predetermined item and the alternate receiver is set in the server 5 in advance, and instead may be optionally set and changed by the user. The server 5 transmits the set information of the alternate receiver together with the delivery information to the receiver terminal 3 of the destination receiver. The receiver terminal 3 of the destination receiver transmits, to the server 5, the information of at least one alternate receiver selected based on the information of the alternate receiver transmitted from the server 5.

The server 5 identifies the receiver terminal 3 of the alternate receiver based on the information of the alternate receiver transmitted from the receiver terminal 3 of the destination receiver, and transmits the identification information of the storage box 2 and the unlocking key information for unlocking the storage box 2 to the identified receiver terminal 3 (step S107).

For example, based on the next room number transmitted from the receiver terminal 3 of the destination receiver, the server 5 transmits the identification information of the storage box 2 and the unlocking key information to the receiver terminal 3 of the receiver with the next room number. Based on the department name transmitted from the receiver terminal 3 of the destination receiver, the server also transmits the identification information of the storage box 2 and the unlocking key information to the receiver terminal 3 of the receiver belonging to the same department as the receiver.

The receiver terminal 3 of the alternate receiver can display code information on the screen based on the received unlocking key information. For example, the alternate receiver can display the code information on the screen of the receiver terminal 3 and unlock the storage box 2 corresponding to the identification information by holding it over the sensor of the storage box 2 (step S108).

Second Embodiment

Figure 3:
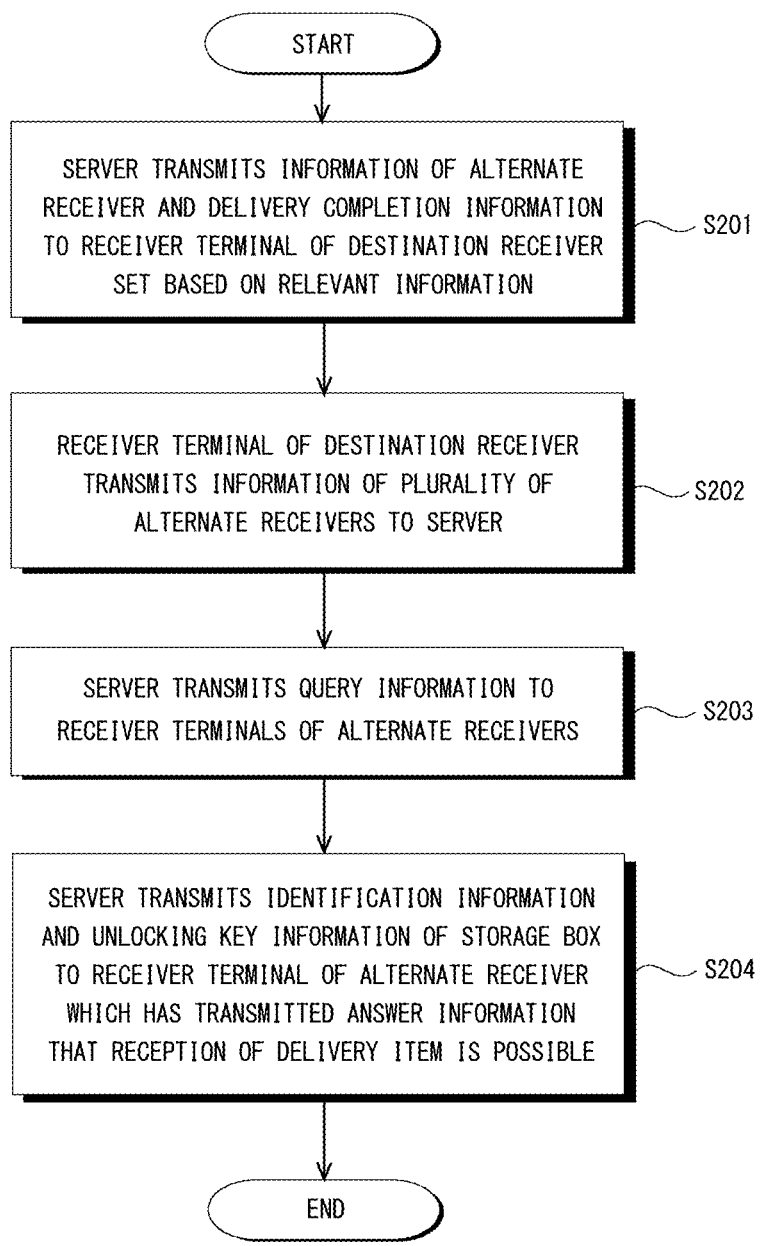
FIG. 3 is a flowchart showing an example of a flow of the delivery method according to this embodiment.

FIG. 3 is a flowchart showing an example of a flow of the delivery method according to this embodiment. The server 5 sets the information of the alternate receiver based on the relevant information, and transmits the set information of the alternate receiver together with the delivery information to the receiver terminal 3 of the destination receiver (step S201).

The receiver terminal 3 of the destination receiver transmits, to the server 5, the information of a plurality of alternate receivers selected based on the information of the alternate receiver transmitted from the server 5 (step S202). Based on the information of the plurality of alternate receivers transmitted from the receiver terminal 3 of the destination receiver, the server 5 transmits the information inquiring whether they can receive a delivery item in the storage box 2 (this information is hereinafter referred to as query information) to the receiver terminals 3 of the alternate receivers (step S203).

When the server 5 receives information of answers from the receiver terminals 3 of the alternate receivers that they can receive the delivery item in the storage box 2, the server 5 transmits the identification information of the storage box 2 and the unlocking key information for unlocking the storage box 2 to the receiver terminal 3 of the alternate receiver (step S204). Thus, the unlocking key can be given only to the alternate receiver after confirming that he/she can receive it.

For example, the server 5 transmits the five room numbers to the receiver terminal 3 of the destination receiver as the information of the alternate receivers set based on the relevant information. Assume that the destination receiver selects, on the receiver terminal, two room numbers out of the five room numbers transmitted from the server. The receiver terminal of the destination receiver transmits the two selected room numbers to the server 5 as information of a plurality of alternate receivers.

Based on the two room numbers transmitted from the receiver terminal 3 of the destination receiver, the server 5 transmits the query information to the receiver terminals 3 of the receivers corresponding to the two room numbers. For example, the server 5 transmits an email with a content of "Would you be able to receive the delivery item in the storage box 2?" as the query information.

When the server 5 receives the information of the answer that the delivery item in the storage box 2 can be received from the receiver terminal 3 of the alternate receiver that has received the query information, the server 5 transmits the identification information of the storage box 2 and the unlocking key information for unlocking the storage box 2 to the receiver terminal 3 of the alternate receiver.

In addition, the server 5 may have a priority set for transmitting the query information to the alternate receivers. In accordance with the priority, the server may transmit the information inquiring whether it is possible to receive the delivery item in the storage box 2 to the receiver terminals 3 of the alternate receivers. This way, based on the priority, after confirming that the alternate receiver can receive the delivery item by making inquiries to a more suitable alternate receiver, the unlocking key can be provided only to that receiver.

The priority may be set based on, for example, the distance from the storage box 2 to the receiver terminal 3. For example, the closer the distance from the storage box 2 to the receiver terminal 3 is, the higher the priority is set.

Alternatively, the priority may be set based on past receipt history information. The past receipt history information is, for example, the number of times delivery items are received in the past, and the higher the number of times, the higher the priority is set.

Further alternatively, the priority may be set based on evaluation information of the receiver who received a delivery item in the past. For example, the higher an evaluation value, the higher the priority is set. Although the priority information is previously set in the server 5, it may be optionally set and changed by the user.

Although some embodiments of the present disclosure have been described, these embodiments are presented as examples and are not intended to limit the scope of the disclosure. These novel embodiments can be implemented in various other forms, and within the scope of the invention, various omissions, substitutions, and modifications can be made without departing from the essence of the invention.

These embodiments and their modifications are included within the scope and spirit of the invention, as well as within the scope of the claims and their equivalents.

For example, the process shown in FIG. 2 or FIG. 3 may be implemented by causing a processor to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The components of the delivery system 1 according to the above-described embodiments are not only implemented programmatically, but some or all of them can also be implemented by dedicated hardware such as an ASIC (Application Specific Integrated Circuit) or an FPGA (Field-Programmable Gate Array).

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A delivery system comprising:
   at least one storage box capable of storing a delivery item;
   a plurality of receiver terminals used by receivers of the delivery item;
   a deliverer terminal used by a deliverer of the delivery item; and
   a server capable of communicating with each of the receiver terminals and the deliverer terminal, wherein
   the deliverer terminal transmits, to the server, identification information of the storage box storing the delivery item and identification information of a destination receiver of the delivery item,
   the server transmits, based on the identification information of the destination receiver of the delivery item transmitted from the deliverer terminal, delivery information notifying the receiver terminal of the destination receiver that the delivery item has been or will be delivered in the storage box,
   the receiver terminal of the destination receiver displays predetermined specific information or group information on a screen in a selectable manner based on relevant information, wherein the predetermined specific information is one of a room number and a department name of an alternate receiver,
   the receiver terminal of the destination receiver displays the predetermined specific information without displaying a name of the alternate receiver,
   the receiver terminal of the destination receiver transmits, to the server, information of an alternate receiver set based on the relevant information about a person who is in a building with the destination receiver and is related to the receiver,
   the server transmits, to the receiver terminal of the alternate receiver, the identification information of the storage box and unlocking key information for unlocking the storage box, based on the information of the alternate receiver transmitted from the receiver terminal of the destination receiver,
   the storage box reads the unlocking key information from the receiver terminal of the alternate receiver and physically unlocks the storage box based on the unlocking key information,
   the server sets information of at least one alternate receiver based on the relevant information and transmits the set information of the alternate receive together with the delivery information to the receiver terminal of the destination receiver,
   the receiver terminal of the destination receiver transmits, to the server, the information of the at least one alternate receiver selected based on the information of the alternate receiver transmitted from the server, and the server transmits the identification information of the storage box and the unlocking key information for unlocking the storage box to the receiver terminal of the alternate receiver based on the information of the alternate receiver transmitted from the receiver terminal of the destination receiver.

2. The delivery system according to claim 1, wherein the receiver terminal of the destination receiver sets the alternate receiver based on the selection made by the destination receiver, and transmits information of the set alternate receiver to the server.

3. The delivery system according to claim 1, wherein the server sets the at least one alternate receiver based on the relevant information and a content of the delivery item.

4. The delivery system according to claim 1, wherein the relevant information is one of a room number and a department name of the receiver.

5. The delivery system according to claim 1, wherein the server transmits query information to the receiver terminals of the alternate receivers inquiring whether they can receive the delivery item in the storage box.

6. The delivery system according to claim 5, wherein the server transmits the identification information of the storage box and the unlocking key information for unlocking the storage box to the receiver terminal of the alternate receiver in response to an answer that the delivery item in the storage box can be received form the receiver terminal of the alternate receiver that has received the query information.

7. The delivery system according to claim 6, wherein the server transmits the query information to a receiver terminal of an alternate receiver having a highest priority in accordance with a priority, and withholds transmission of the query information to a receiver terminal of an alternate receiver having a second highest priority in accordance with the priority until the answer is received from the receiver terminal of the alternate receiver having the highest priority.

8. The delivery system according to claim 7, wherein the priority is based on distance from the storage box to the receiver terminal.

9. The delivery system according to claim 7, wherein the priority is based on a number of times delivery items have been received by the alternate receiver.

10. The delivery system according to claim 7, wherein the priority is based on evaluation information of the alternate receiver.

11. A delivery method performed by a delivery system comprising:

at least one storage box capable of storing a delivery item;
a plurality of receiver terminals used by receivers of the delivery item;
a deliverer terminal used by a deliverer of the delivery item; and
a server capable of communicating with each of the receiver terminals and the deliverer terminal, the delivery method comprising:

transmitting, by the deliverer terminal to the server, identification information of the storage box storing the delivery item and identification information of a destination receiver of the delivery item, transmitting by the server, based on the identification information of the destination receiver of the delivery item transmitted from the deliverer terminal, delivery information notifying the receiver terminal of the destination receiver that the delivery item has been or will be delivered in the storage box;

displaying by the receiver terminal of the destination receiver, predetermined specific information or group information on a screen in a selectable manner based on relevant information, wherein the predetermined specific information is one of a room number and a department name of an alternate receiver;

displaying by the receiver terminal of the destination receiver, the predetermined specific information without displaying a name of the alternate receiver;

transmitting, by the receiver terminal of the destination receiver to the server, information of an alternate receiver set based on the relevant information about a person who is in a building with the destination receiver and is related to the receiver; and transmitting, by the server to the receiver terminal of the alternate receiver, the identification information of the storage box and unlocking key information for unlocking the storage box, based on the information of the alternate receiver transmitted from the receiver terminal of the destination receiver, and reading, by the storage box, the unlocking key information from the receiver terminal of the alternate receiver and physically unlocking the storage box based on the unlocking key information; wherein the server sets information of at least one alternate receiver based on the relevant information and transmits the set information of the alternate receive together with the delivery information to the receiver terminal of the destination receiver, the receiver terminal of the destination receiver transmits, to the server, the information of the at least one alternate receiver selected based on the information of the alternate receiver transmitted from the server, and the server transmits the identification information of the storage box and the unlocking key information for unlocking the storage box to the receiver terminal of the alternate receiver based on the information of the alternate receiver transmitted from the receiver terminal of the destination receiver.

\* \* \* \* \*